UNITED STATES PATENT OFFICE.

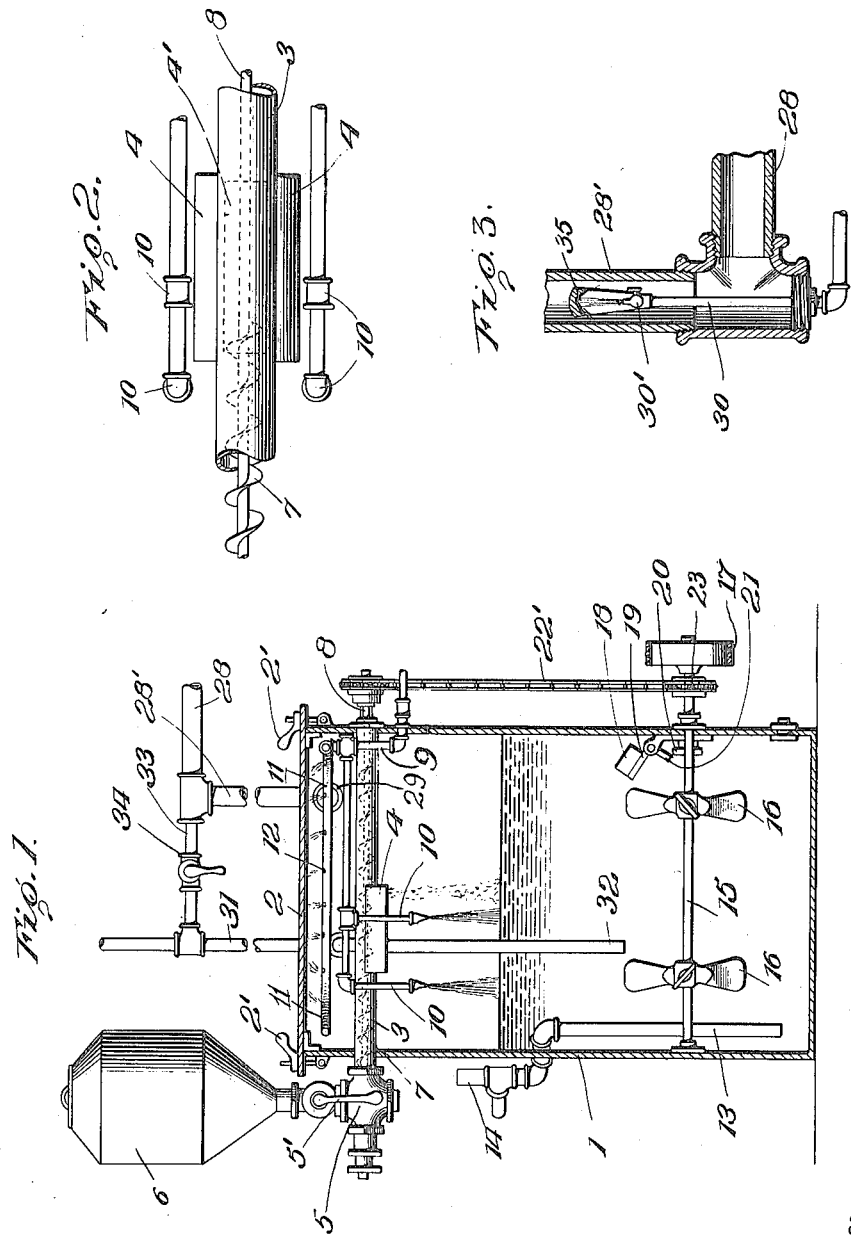

CHARLES A. DUNCAN AND GEORGE L. SHOUP, OF DULUTH, MINNESOTA, ASSIGNORS TO AMERICAN CARBOLITE COMPANY, OF DULUTH, MINNESOTA, A CORPORATION OF MINNESOTA.

ACETYLENE-GAS GENERATOR.

1,148,364.     Specification of Letters Patent.    Patented July 27, 1915.

Application filed January 15, 1913. Serial No. 742,301.

*To all whom it may concern:*

Be it known that we, CHARLES A. DUNCAN and GEORGE L. SHOUP, citizens of the United States, residing at Duluth, in the county of St. Louis and State of Minnesota, have invented certain new and useful Improvements in Acetylene - Gas Generators, of which the following is a specification, reference being had therein to the accompanying drawing.

Our invention relates to improvements in acetylene gas generators.

The object of our invention is to provide a device of this character in which granular or dust carbid can be more readily fed to the generator and more quickly reacted upon by the water.

Another object of our invention is to provide a device of this character in which the maximum amount of gas may be generated from the minimum amount of calcium carbid, and at the same time with perfect safety.

A still further object of our invention is to provide a simple, cheap and more effective device of this character which is automatically controlled throughout.

In the accompanying drawings—Figure 1 is a vertical sectional view through the center of our improved generator. Fig. 2 is a plan view of the carbid feed pipe, showing the arrangement of the water spray on each side thereof. Fig. 3 is an enlarged vertical sectional view of the gas discharge from the generator, showing the water spray for washing and purifying the gas as it leaves the generator and carrying the impurities back into the generator.

In the accompanying drawing, 1 represents the generator tank having at its upper end a removable cover held thereon by means of thumb-nuts 2', whereby access may be readily had to the interior of the generator. Extending across the upper end of the tank 1 and mounted within the side walls thereof, a slight distance below the cover of the tank, is the carbid feed pipe 3. One end of said pipe extends beyond the tank and has connected thereto a coupling 5, to which is connected the carbid supply receptacle 6. The said coupling 5 is provided with a valve 5', whereby the carbid may be readily shut off from the supply pipe 3.

The carbid supply pipe 3, at the center of the tank is provided with a rectangular discharge opening 4' in its lower face and surrounded by the depending flange 4. Within the pipe 3 is suitably mounted the helical feed screw 7, which extends into the coupling 5, and has its inner end terminating at a point directly above the center of the rectangular opening within the pipe 3. Said helical screw is provided with a shaft 8, which extends out through the opposite wall of the tank 1, and having means thereon for rotating the same, which will hereinafter be more fully described.

The upper end of the tank is provided with a water-supply pipe 9, and adapted to furnish a continuous supply of water to the four depending nozzles 10, which surround the carbid as discharged from the opening 4' in the pipe 3. These nozzles furnish four spray-jets of water under pressure which catch the carbid dust as soon as it is discharged upon the body of water and immediately carry the same under the surface of the main body of water in the tank, thus making it impossible for the dust to collect in lumps on the upper surface of the water and to cause trouble, such as has been heretofore found in generators where dust carbid has been used.

Connected to the water supply pipe 9, above the four jets 10, is a pipe 11, divided preferably into two sections and having in their upper faces the perforations 12, by means of which the water is discharged upwardly against the under side of the cover 2, for the purpose of keeping the latter cool and also adding water to the generator and to fill the entire upper portion of the tank with the precipitating spray which further insures the complete and instantaneous submersion of all dust and also washes the gas of impurities to a certain degree.

Connected to the side of the tank 1 about midway of its height is a water overflow pipe 13, which has its lower end extending down within the tank to within a short distance of the bottom thereof. The pipe on the outside of the tank extends upwardly a relatively short distance and is then led off to any suitable place of discharge. At said discharge connection we preferably provide a short open-ended vertical section 14, to admit of the free expansion of the water in the event of the sudden depression of the water within the tank.

The lower end of the tank is provided with a horizontal shaft 15 which carries a plurality of agitators 16, for the purpose of agitating the water in the bottom of the tank and thus preventing the collection of hardened residue thereon. One end of the shaft extends out through the tank 1 and is provided with a pulley 17, by means of which the shaft is rotated. The shaft 15 is provided with a sprocket wheel 22 over which passes a chain 22', said chain passing upwardly over a sprocket wheel 23, carried by the shaft 8, whereby the shaft 8 is rotated for feeding the carbid to the machine. Mounted within the tank just above the shaft 15 is a float 18 carried by the bell-crank lever 19, which has a downwardly extending lug 21. The shaft 15 carries a series of lugs 20, rigidly fixed thereon and when the water within the tank falls below a certain level the lug 21 engages the lugs 20 of the shaft 15 and locks the shaft against rotation. This locking of the shaft thereby stops the feeding of the carbid.

Connected to the upper end of the tank 1, is the gas discharge pipe 28, leading to a gas storage tank, or wherever desired. Within the vertical portion 28' of the pipe 28, we install a small vertically disposed water supply pipe 30 having a discharge nozzle 30' in the uppermost end thereof, which discharges upwardly against the concave cap 35 supported by the pipe 30, causing a fine continuous spray of water discharging downwardly within the gas pipe 28' and thus washes and purifies the gas. We also provide a second gas pipe 31 leading from the generator tank from approximately the same level of the pipe 28, this being a safety discharge and leading well down into the water of the tank as at 32, so that in the event of an abnormal gas pressure arising within the tank, the gas would force out the water, uncover the lower end of this safety discharge pipe 32 and escape through it to the outside atmosphere. The safety discharge pipe 31 on the outside of the tank is also connected to the discharge pipe 28 by cross-pipe 33, having a suitable shut-off valve 34 therein, so that any portion of the gas generated may be exhausted to the outside atmosphere through this pipe 31 when desired.

The operation of our device is as follows: The device is set in motion by rotating the pulley 17 by a belt, or in any other desired manner, which through the medium of the chain 22' and the sprocket 23, the shaft 8 is set in motion causing the worm 7 to feed the carbid from the receptacle 6, through the pipe 3 and discharge it through the opening 4' into the tank, it being understood, of course, that the water supplies had previously been turned on and the tank supplied with the proper amount of water. As the carbid is discharged through the opening 4' into the tank chamber it is immediately caught by the water jet spray from the nozzle 11 and carried directly under the surface of the main body of water in the tank. Water is also supplied through the pipe 11, against the under side of the cover 2, whereby the entire upper end of the tank is filled with a fine spray of water causing any of the dust that is in the tank above the water to be instantly precipitated, thus purifying the gas. When the water within the tank 1 falls below the float 18, the shaft 15 is locked, as heretofore described, which stops the shafts 15 and 8 and causes the feed of the calcium carbid to cease. By this method of continuously mixing the carbid and water as they enter the tank and during precipitation therein it is evident that a continuous discharge of water from the tank is essential and which is provided for by means of the discharge pipe 13 as above described. This continuous discharge also provides means whereby the residue carried by the water is being constantly removed from the tank which avoids any necessity of the tank being periodically cleaned and permits of continuous operation of the device.

Having thus described our invention, what we claim and desire to secure by Letters Patent is:

1. An acetylene gas generator comprising a closed tank having a gas outlet, a horizontal tube extending across the upper end of the tank, a carbid receptacle connected to the tube on the outside of the tank, a worm for feeding the calcium carbid from the receptacle to the center of the tube where it is discharged into the tank and jets of water on each side of the tube and spraying the water downwardly to cause the calcium carbid to be submerged in the water of the tank.

2. An acetylene gas generator comprising a closed tank having a gas outlet, a tube extending across the upper end of the tank and having a central elongated opening, means for feeding the calcium carbid through the tube and discharging it through the opening, jets of water on each side of the opening and discharging the water in a downward direction to submerge the calcium carbid as it falls from the tube into the water contained in the tank, and means for spraying water against the upper end of the tank, substantially as shown and described.

3. An acetylene gas generator comprising a closed tank having a gas outlet, a tube extending across the upper end of the tank and having a central opening in its lower face, means for feeding the calcium carbid through the tube and discharging it from said opening, a series of jets below the tube around the central opening and discharging water in a downward direction on the calcium carbid as it falls from the tube into the water contained in the tank for submerging the same, a circular water supply pipe adjacent the upper end of the tank and having openings adapted to spray water in an upwardly and inwardly direction against the top of the tank for the purpose described.

4. An acetylene gas generator comprising a closed tank having a gas outlet, a calcium carbid feed for the upper end of the tank at or near the center thereof, means for supplying water in a downward direction upon the calcium carbid as it falls upon the surface of the water contained in the tank, and means for spraying the water in an upward and inward direction against the top of the tank above the calcium carbid feed.

5. An acetylene gas generator comprising a closed tank having a gas outlet, a tube extending across the upper end of the tank and having a central opening in its lower face, downwardly extending plates on each side of said opening, means for feeding calcium carbid through the tube and discharging it from the said opening, and means for supplying water in a downwardly direction below the discharge of the calcium carbid from the tube and in an upward direction above the discharge of the calcium carbid.

6. An acetylene gas generator, comprising a closed tank having a gas outlet, a horizontal tube extending across the upper end of the tank, a carbid receptacle connected to the tube on the outside of the tank, a worm for feeding the calcium carbid from the receptacle to the center of the tube where it is discharged into the tank, jets of water on each side of the tube and spraying the water downwardly to cause the calcium carbid to be submerged in the water of the tank, jets of water above the tube and spraying the water upwardly against the top of the tank and a shaft carried by the worm and extending out through the opposite side of the tank and means carried by the shaft for rotating the same, whereby the worm is rotated, substantially as shown and described.

In testimony whereof we affix our signatures in presence of two witnesses.

CHARLES A. DUNCAN.
GEORGE L. SHOUP.

Witnesses:
   J. S. STRATE,
   R. L. DAVIDSON.